United States Patent
Lee et al.

(10) Patent No.: US 11,739,985 B2
(45) Date of Patent: Aug. 29, 2023

(54) BORON CARBIDE BILAYER FOAM SOLAR EVAPORATOR AND METHOD FOR PREPARING THEREOF

(71) Applicant: City University of Hong Kong, Hong Kong (HK)

(72) Inventors: Chun-Sing Lee, Hong Kong (HK); Shengliang Li, Hong Kong (HK); Qi Zhao, Hong Kong (HK); Ming-Fai Lo, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 184 days.

(21) Appl. No.: 17/475,333

(22) Filed: Sep. 14, 2021

(65) Prior Publication Data

US 2022/0082302 A1 Mar. 17, 2022

Related U.S. Application Data

(60) Provisional application No. 63/078,389, filed on Sep. 15, 2020.

(51) Int. Cl.
*F24S 10/80* (2018.01)
*C02F 1/04* (2023.01)
(Continued)

(52) U.S. Cl.
CPC ............ *F24S 10/80* (2018.05); *B01D 1/0035* (2013.01); *B29C 44/3415* (2013.01);
(Continued)

(58) Field of Classification Search
CPC ... B29C 70/603; B29C 70/086; B29C 70/026; B29C 2037/0035; B29C 44/3442;
(Continued)

(56) References Cited

U.S. PATENT DOCUMENTS

| 4,110,172 A | 8/1978 | Spears, Jr. |
| 4,121,977 A | 10/1978 | Carson |
| 8,341,961 B2 | 1/2013 | Glynn |

FOREIGN PATENT DOCUMENTS

WO 2016058722 A1 4/2016

OTHER PUBLICATIONS

Xuan Wu et al., A Plant-Transpiration-Process-Inspired Strategy for Highly Efficient Solar Evaporation, Adv. Sustainable Syst. 2017, 1, 1700046.
(Continued)

*Primary Examiner* — Stella K Yi
(74) *Attorney, Agent, or Firm* — Idea Intellectual Limited; Margaret A. Burke; Sam T. Yip

(57) ABSTRACT

The present invention provides a solar absorber incorporated bilayer foam solar evaporator for seawater and wastewater purification including a plurality of solar absorbers partially incorporated into a porous polymer framework and partially forming a thermal insulation layer proximal to solar irradiation. In particular, low-cost commercially available $B_4C$ powders are embedded into a porous polymer foam in a one-pot method to form a scaffold of boron carbide bilayer foam (BCBF) with good hydrophilic wettability, heat-shielding, and solar-thermal conversion. The boron carbide bilayer foam (BCBF) of the present invention enables a high cost-performance seawater desalination and wastewater purification at a high evaporation rate of 2.8 $kg/m^2/h$ with 93% solar evaporation efficiency under 1 sun illumination (or 1 $kW/m^2$). The present invention thereby provides an excellent and cost-effective solar evaporator tool for industrial-level water purification. Following the present method to prepare the BCBF solar evaporator, the fabrication cost can be as low as 3.6 \$/$m^2$.

9 Claims, 11 Drawing Sheets

(51) Int. Cl.
    *B01D 1/00*     (2006.01)
    *C02F 1/14*     (2023.01)
    *F24S 70/10*     (2018.01)
    *F24S 70/60*     (2018.01)
    *F24S 70/14*     (2018.01)
    *F24S 70/16*     (2018.01)
    *B32B 27/06*     (2006.01)
    *B29C 44/34*     (2006.01)
    *C02F 103/08*     (2006.01)
    *F24S 80/00*     (2018.01)

(52) U.S. Cl.
    CPC ........ *B29C 44/3442* (2013.01); *B32B 27/065* (2013.01); *C02F 1/048* (2013.01); *C02F 1/14* (2013.01); *F24S 70/10* (2018.05); *F24S 70/14* (2018.05); *F24S 70/16* (2018.05); *F24S 70/60* (2018.05); *B32B 2250/22* (2013.01); *B32B 2266/0221* (2013.01); *B32B 2266/0278* (2013.01); *B32B 2266/031* (2016.11); *B32B 2266/04* (2013.01); *C02F 2103/08* (2013.01); *F24S 2080/01* (2018.05); *F24S 2080/011* (2018.05); *F24S 2080/013* (2018.05); *F24S 2080/015* (2018.05)

(58) Field of Classification Search
    CPC ..... B29C 44/3415; B01D 1/0035; C02F 1/14; C02F 1/048
    See application file for complete search history.

(56) References Cited

OTHER PUBLICATIONS

Lianbin Zhang et al., Hydrophobic Light-to-Heat Conversion Membranes with Self-Healing Ability for Interfacial Solar Heating, Adv. Mater. 2015, 27, 4889-4894.

Xiaoning Han et al., Hydrophilic polymer-stabilized porous composite membrane for water evaporation and solar iesalination, RSC Adv., 2020, 10, 2507-2512.

Shuaiming He et al., Nature-inspired salt resistant bimodal porous solar evaporator for efficient and stable water iesalination, Energy Environ. Sci., 2019, 12, 1558-1567.

Youhong Guo et al., Synergistic Energy Nanoconfinement and Water Activation in Hydrogels for Efficient Solar Water Desalination, ACS Nano, 13, 7913-7919.

Qian Wang et al., Controlled growth and shape-directed self-assembly of gold nanoarrows, Sci. Adv 2017;3: e1701183.

Huaying Ren et al., Hierarchical Graphene Foam for Efficient Omnidirectional Solar-Thermal Energy Conversion, Adv. Mater. 2017, 29, 1702590.

Kyuyoung Bae et al., Flexible thin-film black gold membranes with ultrabroadband plasmonic nanofocusing for efficient solar vapour generation, Nat. Commun., 6, 10103.

George Ni et al., Steam generation under one sun enabled by a floating structure with thermal concentration, (2016), Nat. Energy, 1.

Xu Wang et al., Multilayer Polypyrrole Nanosheets with Self-Organized Surface Structures for Flexible and Efficient Solar-Thermal Energy Conversion, Adv. Mater. 2019, 31, 1807716.

Mengmeng Zhu et al., Carbonized daikon for high efficient solar steam generation, Solar Energy Materials and Solar Cells 191 (2019) 83-90.

Xiaofeng Lin et al., Integrative Solar Absorbers for Highly Efficient Solar Steam Generation, Journal of Materials Chemistry A, 2013.

Feng (Frank) Gonga et al., IScalable, eco-friendly and ultrafast solar steam generators based on one-step melamine-derived carbon sponges toward water purification, Nano Energy, 58, 322-330.

Yong Li et al., Highly Efficient and Stable Perovskite Solar Cells Using a Dopant-Free Inexpensive Small Molecule as the Hole-Transporting Material, Adv. Energy Mater. 2018, 8, 1801248.

BORON CARBIDE BILAYER FOAM SOLAR EVAPORATOR AND METHOD FOR PREPARING THEREOF

CROSS-REFERENCE TO RELATED APPLICATIONS

The present application claims priority from the U.S. Provisional Patent Application No. 63/078,389 filed Sep. 15, 2020, and the disclosure of which is incorporated herein by reference in its entirety.

FIELD OF THE INVENTION

The present invention relates to a bilayer composite foam solar evaporator for seawater desalination and/or wastewater purification. In particular, the present invention relates to a boron carbide bilayer foam incorporated into a porous polymer framework as a solar evaporator for seawater desalination and/or wastewater purification. Related preparation method is also provided.

BACKGROUND

Water shortage has become one of the most pervasive global issues mainly due to the limited freshwater supply, exploding increased population, and growing environmental pollution. As a renewable and sustainable resource, solar energy, has been widely believed to be a powerful driving force for solving the global energy dilemma and environmental problems. In recent years, solar evaporation, which utilizes solar energy to generate local heat for water steam generation, has attracted much attention for its excellent potential for seawater desalination, wastewater purification, and sterilization. To realize efficient solar evaporation, many light-harvesting materials that feature high solar-thermal conversion performance have been explored as solar absorbers. These mainly include plasmonic metal nanoparticles (NPs), carbonaceous materials, in-organic semiconductors and organic polymers, etc. Although many of these reported absorbers do have high performance on solar water evaporation, practical applications of some of these materials are limited by their operation stability and high cost. Thus, the exploitation of more stable and lower cost absorber material is highly essential for wide commercial applications.

To obtain a high solar water evaporation rate, the most important requirement is high optical absorbance over the solar spectrum. Besides, the absorber should also have good thermal insulation and hydrophilic wettability to facilitate good heat management and fast water transport such that heating can be localized at the liquid-vapor interface. Thus, developing of hydrophilic porous structure with good interfacial heating-vapor interaction plays important role in achieving efficient solar evaporation. These requirements are typically achieved by employing a bilayer hierarchical network composed of an upper solar-thermal layer and a lower water-transport layer. Based on this design, materials including ferroferric oxide ($Fe_3O_4$), melamine, polypyrrole, and metal-organic framework (MOF) have been used as effective solar absorbers.

Solar water evaporation holds great promising for future seawater desalination and wastewater purification via solar energy harvesting and efficient steam generation. While many performance advances have been achieved, up to now the low cost-performance remains a serious hindrance to practical applications.

Therefore, there is a need for a good performance, high stability, and highly cost-effective solar evaporator for practical water purification under extreme conditions.

SUMMARY OF THE INVENTION

To overcome the limitations, a first aspect of the present invention provides a solar absorber based evaporator to achieve a highly cost-effective seawater desalination and wastewater purification by integrating a full-solar absorber into a porous polymer framework according to the present invention.

In a second aspect, the present invention provides a one-pot method for preparing a solar evaporator. In a preferred embodiment, incorporating a plurality of commercially available, low-cost materials into a porous polymer framework to provide an ultra-high cost-effective solar evaporator at 778 g/h/$ with a high evaporation rate as high as 2.8 kg/m$^2$/h and 93% solar evaporation efficiency under 1 sunlight radiation, which preparation cost is far lower than that of any of the conventional solar evaporation systems.

Accordingly, the first aspect of the present invention provides a solar absorber incorporated bilayer foam solar evaporator for seawater and wastewater treatment, where the solar absorber includes:
- a porous polymer framework; and
- a plurality of hydrophilic solar absorbers partially incorporated into the porous polymer framework and partially forming a thermal insulation layer while the porous polymer framework incorporated with the hydrophilic solar absorbers providing a highly wettable structure to facilitate water transportation under solar irradiation of at least 1 kW/m$^2$ in ambient air.

In one embodiment, the porous polymer framework includes one or more polymers of polyvinyl alcohol (PVA), polydimethylsiloxane (PDMS), polyurethane (PU) and melamine.

In one embodiment, the plurality of solar absorbers is selected from boron carbide.

In one embodiment, the thermal insulation layer is disposed proximal to the solar irradiation and distal to a contact surface of the solar evaporator with the seawater or wastewater.

In one embodiment, the porous polymer framework is disposed proximal to the contact surface of the solar evaporator with the seawater or wastewater and distal to the solar irradiation.

In one embodiment, the solar absorbers have a water contact angle of about 44°.

In one embodiment, the plurality of solar absorbers is in a weight ratio of 1:2-19 to the one or more polymers of the porous polymer framework, and wherein the one or more polymers is polyvinyl alcohol.

In other embodiment, the weight ratio of the plurality of solar absorbers to the one or more polymers of the porous polymer framework is tunable according to the application requirements of the solar evaporator.

In one embodiment, the amount of boron carbide is from more than 0 to 50 wt % to one or more polymers of the porous polymer framework.

The solar absorber incorporated bilayer foam solar evaporator according to the first aspect of the present invention has an evaporation rate of about 2.8 kg/m$^2$/h of seawater or wastewater under 1 kW/m$^2$ solar irradiation, an overall heavy metal removal efficiency of about 99.9%, and a bacterial removal efficiency of 99.99% under 1 kW/m$^2$ solar irradiation for 1 hour. The heavy metals which can be removed by the solar evaporator includes but not limited to $Hg^+$, $Cd^{2+}$, $Pb^{2+}$, $Fe^{3+}$, $Co^{2+}$, $Ni^{2+}$, $Ag^+$, $Zn^{2+}$, $Na^+$, $Mg^{2+}$, $K^+$, and $Ca^{2+}$.

The solar evaporator in the first aspect of the present invention has a working pH range of 1 to 14.

In the second aspect, the present invention provides a method for preparing a scaffold of a solar absorber incorporated bilayer foam for seawater desalination and wastewater purification, where the method includes:

dissolving a plurality of solar absorbers into a solvent thoroughly;

mixing the plurality of solar absorbers dissolved in solvent with one or more polymers vigorously to form a gelation formation mixture;

adding the gelation formation mixture into a solution of hydrochloric acid and glutaraldehyde dropwisely to have an in-situ gelation to form a hydrogel;

settling the hydrogel at a low temperature;

freeze-drying the hydrogel until an aerogel is obtained which is the scaffold of the solar absorber incorporated bilayer foam In one embodiment, the mixing of the plurality of solar absorbers dissolved in solvent with the one or more polymers vigorously is by sonication for about 1 to 60 minutes until the gelation formation mixture is formed.

In one embodiment, the addition of the gelation formation mixture into the solution of hydrochloric acid and glutaraldehyde dropwisely includes mild stirring during the addition for about 0.5 to 6 hours until the hydrogel is formed.

In one embodiment, the settling of the hydrogel is carried out by immersing the hydrogel in water for overnight at about 5 to –30 degrees Celsius.

In one embodiment, the one or more polymers comprise polyvinyl alcohol (PVA), polydimethylsiloxane (PDMS), polyurethane (PU) and melamine.

In a preferred embodiment, the plurality of solar absorbers is selected from boron carbide.

In a further embodiment, the boron carbide dissolved into the solvent is mixed with the one or more polymers in a weight ratio of 1:2-19, and wherein the one or more polymers is selected from polyvinyl alcohol.

In yet another embodiment, the boron carbide at more than 0 to about 50% w/w with respect to polyvinyl alcohol is dissolved in the solvent.

In an embodiment, the solvent to dissolve the boron carbide is an organic solvent selected from ethanol, methanol, acetone, or tetrahydrofuran.

The present method can also be used to prepare the solar absorber incorporated bilayer foam for the solar evaporator in the first aspect with variations described herein which should still be within the spirit and objectives of the present invention.

BRIEF DESCRIPTION OF THE DRAWINGS

Embodiments of the invention are described in more details hereinafter with reference to the drawings, in which.

DETAILED DESCRIPTION OF THE INVENTION

In the following description, systems, devices, methods of, and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

It should be apparent to practitioner skilled in the art that the foregoing and subsequent examples of the system and method are only for the purposes of illustration of working principle of the present invention. It is not intended to be exhaustive or to limit the invention to the precise forms disclosed.

In the preferred embodiment, $B_4C$ powders are selected as solar absorber because they not only have good optical absorption over the solar spectrum, but also have very good stability in different extreme environments (e.g. high temperature, strong acid, base, oxidation resistance, etc). These materials are very suitable for being applied in seawater desalination and wastewater purification system which are usually exposed to a very extreme environment.

These merits also suggest that the resulting solar absorber shall also have good stability and solar-thermal conversion performance. After embedding into a polymer framework such as polyvinyl alcohol (PVA) foam (Scheme 1), the boron carbide bilayer foam (BCBF) achieved a high evaporation rate of 2.8 kg/m²/h with a solar evaporation efficiency of 93% under 1 sun illumination. Combining this good solar steam generation performance with the very low cost, the BCBF delivers a record high cost-effectiveness of 778 g/h/$. It is also demonstrated that the present can be achieved low-cost high rate freshwater production from water contaminated with various kinds of common contaminants including heavy metals, dyes, and microorganisms. The composite foam can also work in extreme conditions, including concentrated acid, strong alkali, and high salinity.

Figure 1:
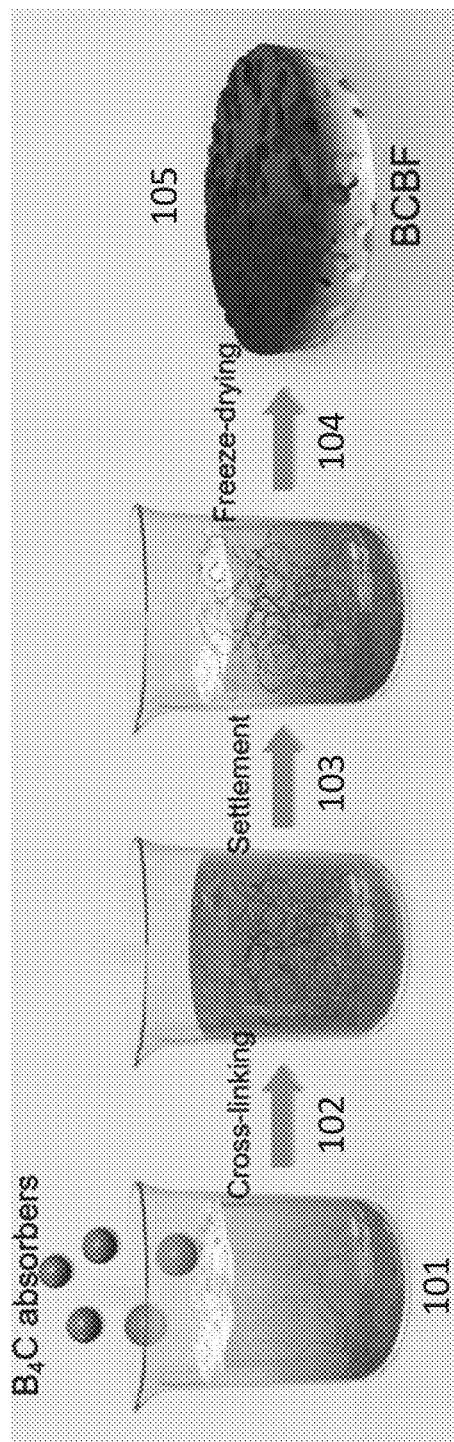
FIG. 1 schematically depicts how a boron carbide bilayer foam (BCBF) based solar evaporator is prepared according to an embodiment of the present invention.

Turning to FIG. 1, boron carbide ($B_4C$) powders are added into an organic solvent system, followed by mixing with polyvinyl alcohol (PVA) (101) to form a gelation formation mixture, then the gelation formation mixture is added dropwisely into a solution of diluted HCl and glutaraldehyde (102) to form an in-situ gelation. In one embodiment, weight ratio between $B_4C$ powders and PVA is 1:2. In other embodiments, amount of $B_4C$ powders added can vary to obtain different mass loads of $B_4C$ in the boron carbide bilayer foam (BCBF). The $B_4C$ powders after dissolved into the organic solvent is mixed with the PVA by sonication for 1 to 60 mins to obtain the gelation formation mixture. The gelation formation mixture is added dropwisely into the solution of HCl and glutaraldehyde under mild stirring for about 0.5 to 6 hours to have an in-situ gelation. During the in-situ gelation, cross-linking occurs among polymers to form a polymer framework incorporating boron carbide. A hydrogel is obtained after the in-situ gelation, and is then settled in water at a low temperature for overnight (103). $B_4C$ tends to sediment to the bottom of the reaction system to form a bilayer structure. Preferably, the hydrogel is settled by immersing in water and then storing at 5 to −30 degrees Celsius for overnight. After freeze-drying the hydrogel (104), an aerogel is obtained (105), which is a scaffold of boron carbide bilayer foam in a porous polymer framework.

Figure 2A:
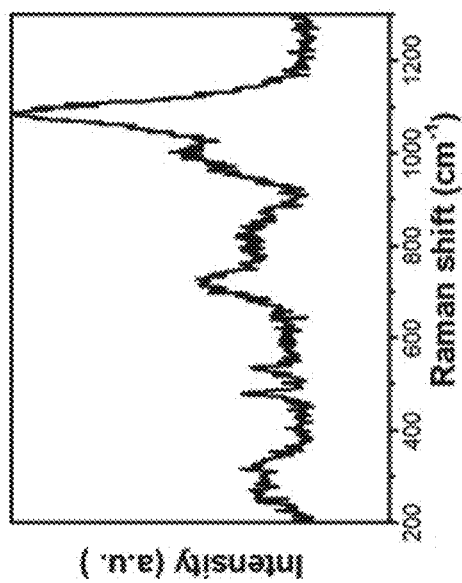
FIG. 2A shows X-ray diffraction (XRD) of $B_4C$ used in the present invention.
Figure 2B:
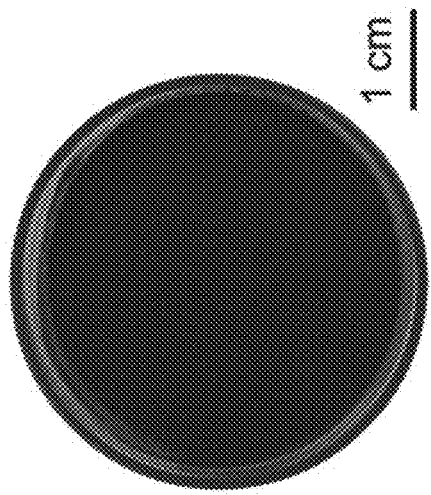
FIG. 2B shows Raman spectrum of $B_4C$ used in the present invention.
Figure 2C:
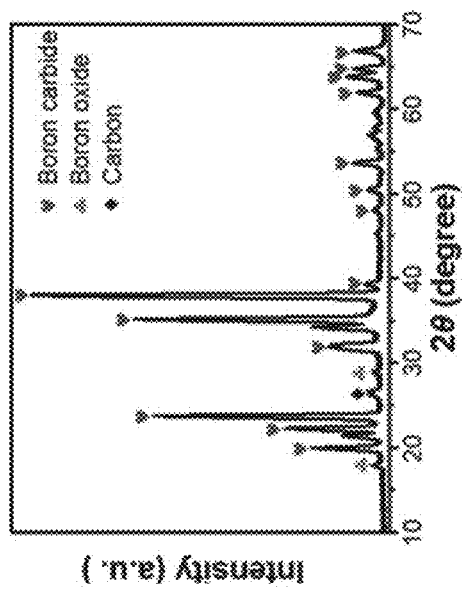
FIG. 2C shows absorption spectrum of $B_4C$ used in the present invention.
Figure 2D:
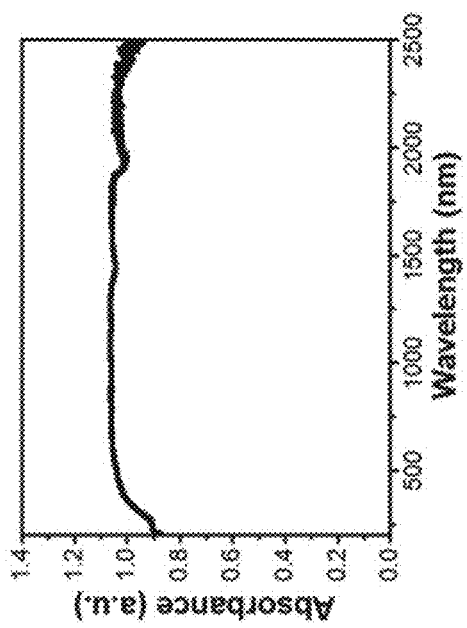
FIG. 2D shows digital photograph of $B_4C$ layer formed in the present invention.

Turning to FIG. 2A, it shows the chemical structure of the $B_4C$ used in the present invention, where the XRD pattern at two theta confirms the rhombohedral crystal form thereof (there are some minor peaks representing boron oxide and carbon, but the intensity is relatively smaller). The Raman spectrum of $B_4C$ in FIG. 2B shows peaks at 270, 318, 480, 536, 715, 799, 826, 1,001 and 1,088 cm$^1$ which correspond to the vibrations of the principal structural elements: icosahedra and three-atom linear chains in the crystalline $B_4C$ (FIG. 2B). UV-Vis-NIR absorption spectrum of $B_4C$ is also shown in FIG. 2C. The $B_4C$ layer exhibits full-solar absorption and a distinguishable black color (FIG. 2D). The $B_4C$ as solar absorber of the present invention has solar absorption efficiency of about 99.4%, which is better than many known solar absorbers.

Figures 3A, 3B, 3C:
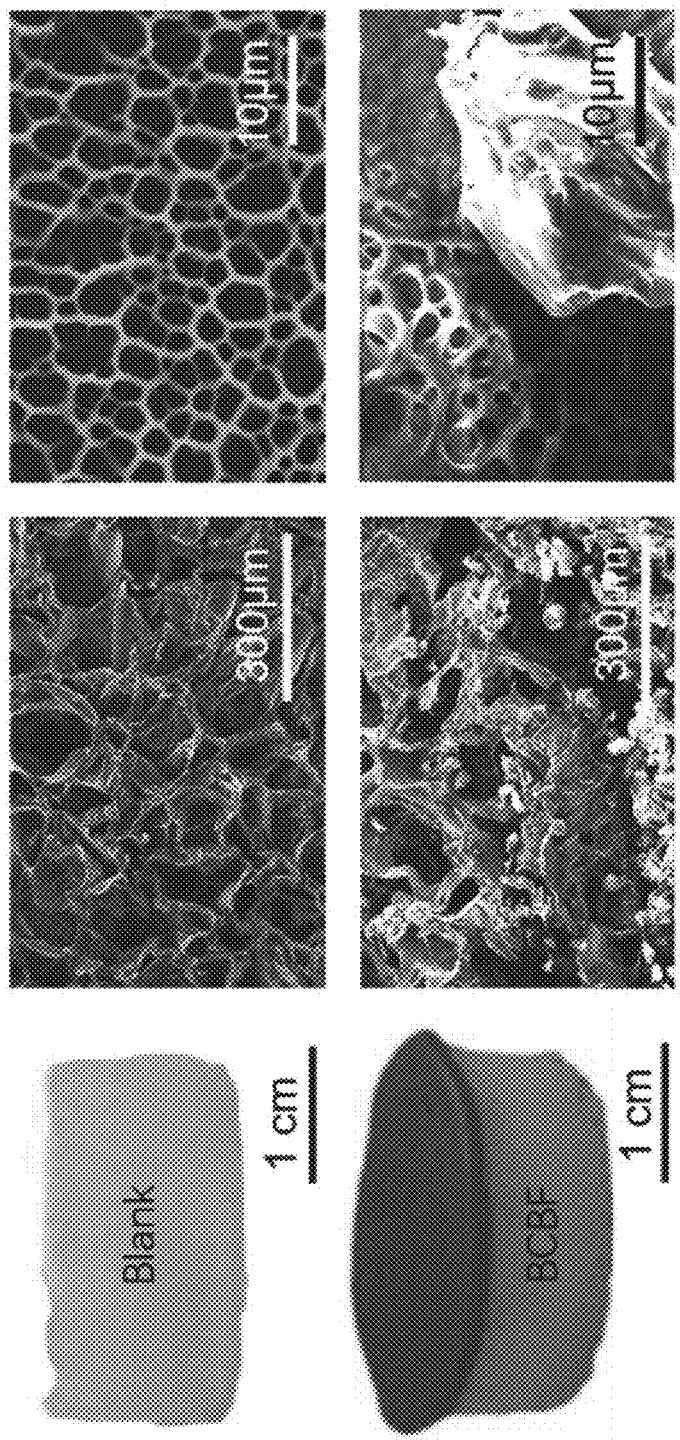
FIG. 3A shows photos of a blank foam (top panel) and BCBF (bottom panel)
FIG. 3B shows SEM image of a blank foam (top panel) and BCBF (bottom panel) in lower magnification.
FIG. 3C shows SEM image of a blank foam (top panel) and BCBF (bottom panel) in higher magnification.

Turning to FIGS. 3A-3C, the appearance of a blank (top panel) and the present BCBF (bottom panel) and their micro-structure under scanning electronic microscopy in lower and higher magnifications are shown. As it can be seen, a darker aerogel foam is obtained from BCBF, especially at the top layer of the bilayer structure containing $B_4C$ when the aerogel foam is turned upside down out of the reaction container, as compared to the blank polymer (PVA) foam (FIG. 3A); a cross-section of the blank PVA foam (without $B_4C$) shows abundant capillary channels with some sub-10 μm micropores in the internal wall structure thereof (FIG. 3B) for facilitating water transportation by capillary force; from a higher magnification SEM image, the cross-section of the present BCBF, PVA foam is shown to be loaded with $B_4C$ particles with an average size from approximately 10 to 70 μm (FIG. 3C). Loading of $B_4C$ particles in the BCBF does not significantly affect the pore size of the PVA foam.

Figure 3F:
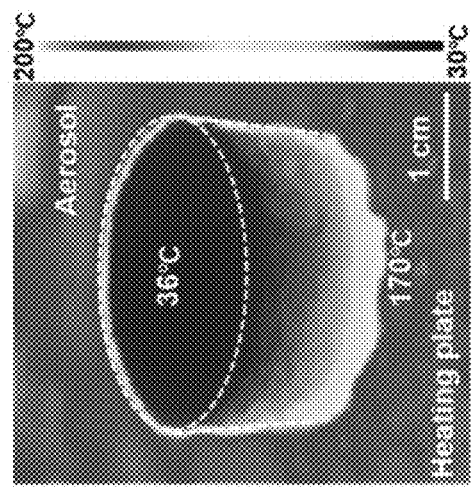
FIG. 3F shows a thermal insulation performance
Figure 3E:
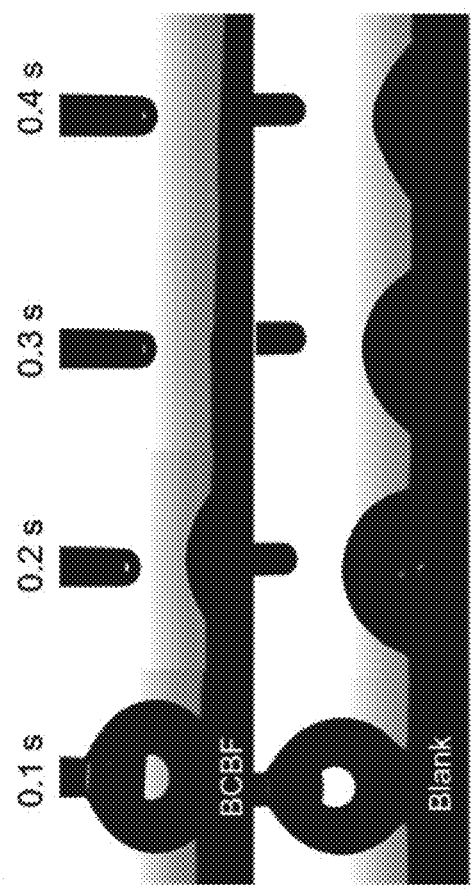
FIG. 3E shows water droplet impregnation process on the surface of the present BCBF (top panel) and blank PVA foam (bottom panel)
Figure 3D:
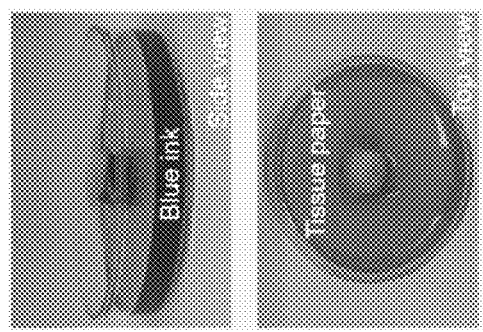
FIG. 3D shows wettability of the present BCBF according to an embodiment of the present invention.

Turning to FIG. 3D, the present BCBF (about 2 cm diameter) is turned into blue color within 18 sec when it is placed on the bottom of a Petri dish filled with blue ink aqueous solution.

To further demonstrate the wettability of the present BCBF, a series of digital photos showing process of water droplet impregnation on the surface of the present BCBF confirms that loading of the $B_4C$ particles facilitates water transportation in the PVA framework (~0.2 sec) as compared to that on the PVA blank foam (~0.4 sec) (FIG. 3E). The present BCBF is shown to have a water contact angle of 44°, compared to 77° in the blank PVA foam.

To demonstrate solar steam generation performance, the present BCBF is put onto a heating plate with a surface temperature of 170° C. and the temperature profile in the present BCBF is continuously monitored by an infrared camera (FIG. 3F). It can be seen from the thermal profile that the top surface, which is about 1 cm from the bottom of the BCBF, is only about 36° C., confirming that the present BCBF is a good thermal insulator, in addition to its water transportation efficiency and hydrophilicity.

As compared with a graphene-based aerogel, the present BCBF is more hydrophilic mainly due to more abundant porous structures in the present BCBF which would offer a more efficient water transportation within the foam network. The present BCBF also has lower mass density and higher flexibility, which facilitates floating at water-air interface and transportation of water from water side to the air side of the BCBF for evaporation.

Figure 4B:
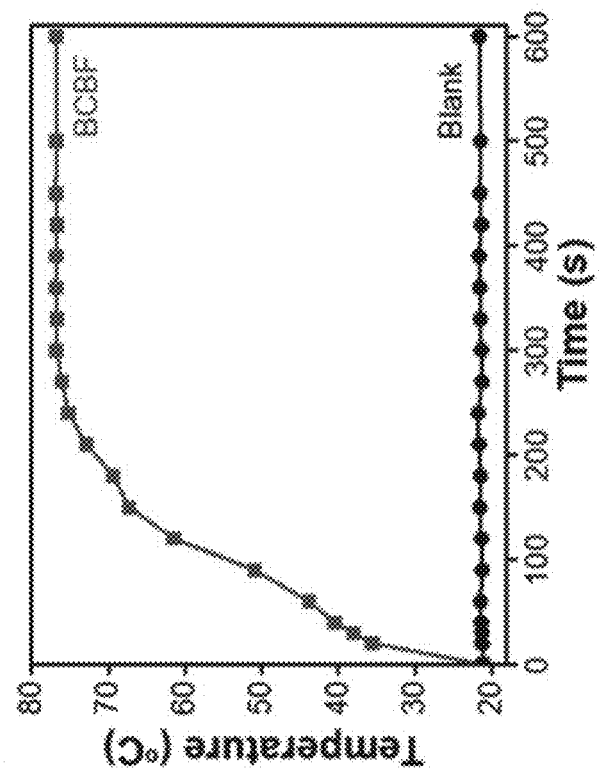
FIG. 4B show temperature change in the present BCBF within 10 minutes of irradiation of 1 solar light in air compared with a blank PVA foam.
Figure 4A:
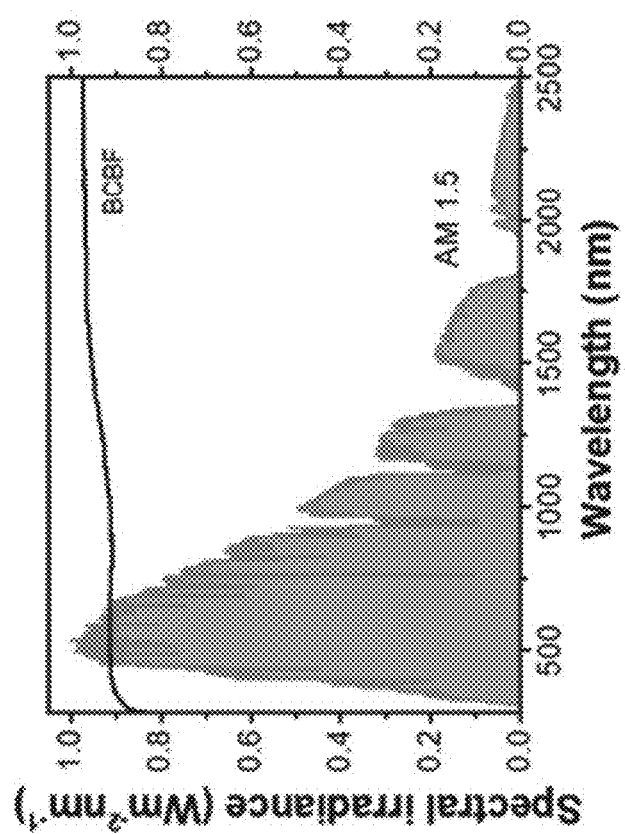
FIG. 4A shows solar absorption (dark line) and absorption spectra as a function of light wavelength by BCBF according to an embodiment of the present invention.

Turning to FIG. 4A, the present BCBF is shown to have good light absorption capacity over the whole solar spectrum. Optical reflectance measurements also confirmed that the present BCBF has substantially negligible reflectance from 400 to 2000 nm (not shown in FIG. 4A), whereas blank PVA foam exhibits strong reflection.

Turning to FIG. 4B, solar-thermal conversion capability of the present BCBF is further characterized by measuring the temperature change using an irradiation source (e.g., a Xenon lamp) under 1 kW/m² in air which is considered to be equivalent to 1 solar light in air. Upon continuous illumination, the present BCBF has a rapid temperature increase within a 10 min-irradiation with a maximum temperature of 77° C. The present BCBF is measured to have effectively held equilibrium temperature, whereas the temperature of the blank PVA foam substantially remains unchanged under the same illumination conditions.

Figure 5B:
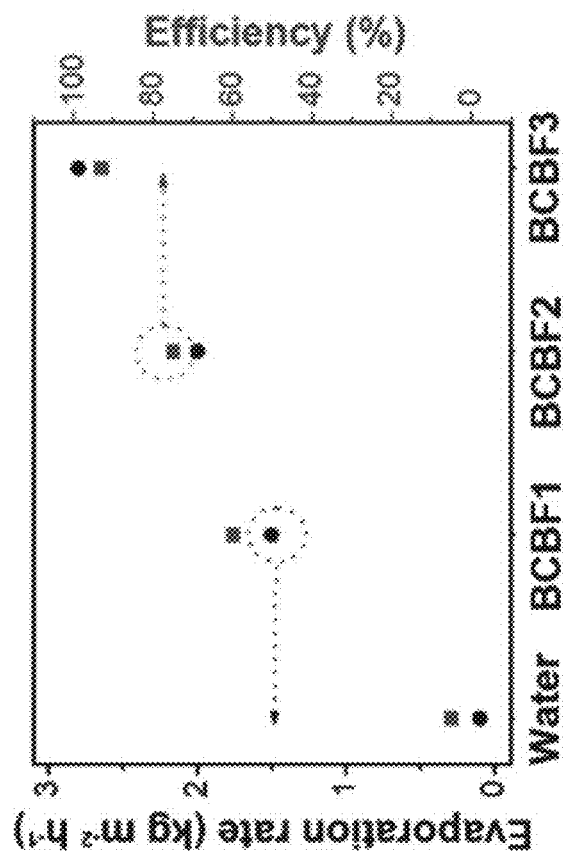
FIG. 5B shows evaporation rates and solar conversion efficiencies of different BCBFs prepared according to various embodiments of the present invention.
Figure 5A:
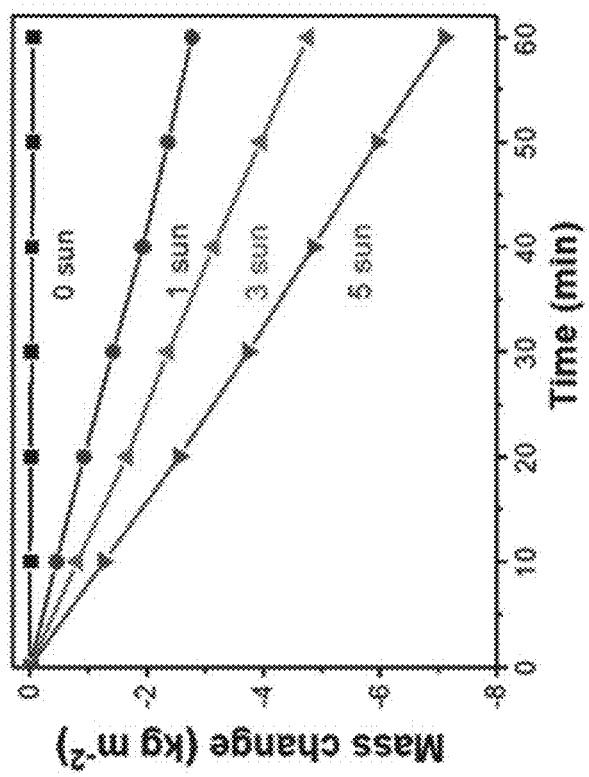
FIG. 5A shows mass change in BCBF as a function of different irradiations against exposure time.

Turning to FIG. 5A, the present BCBF is shown to have an evaporation rate of 2.8, 4.8 and 7.1 kg/m²/h under 1, 3, and 5 kW/m³ irradiation, respectively. The present BCBF is further compared with a boron carbide monolayer foam (BCMF) under 1 kW/m³ irradiation. The evaporation rate of the present BCBF (2.8 kg/m²/h) is higher than that of the BCMF (1.63 kg/m²/h), suggesting that bilayer structure of boron carbide based composite foam has a better solar water evaporation rate under 1 solar light in air than that of the monolayer structure.

Turning to FIG. 5B, the evaporation rate of BCBF is increased as the mass loadings of PVA increases, where the weight ratio of $B_4C$: PVA in BCBF1, BCBF2, and BCBF3 are 1:2, 1:9 and 1:19, respectively.

Figure 5C:
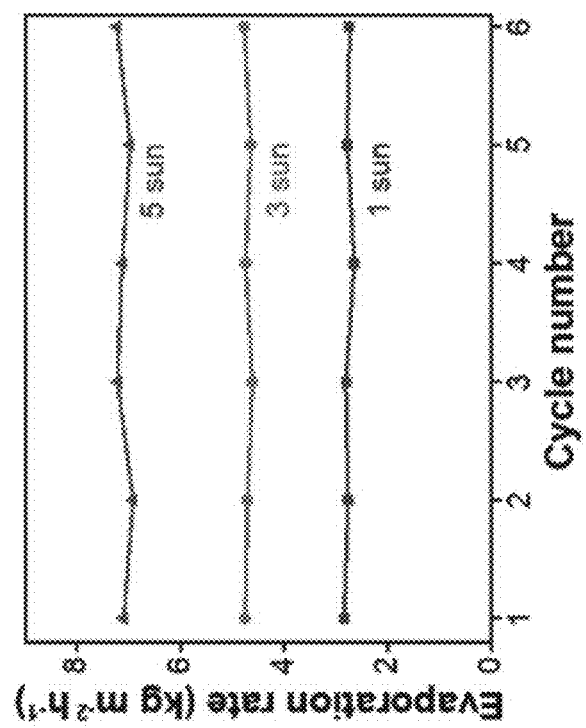
FIG. 5C shows change in evaporation rate of BCBF under different intensities of solar illumination for 6 cycles according to a preferred embodiment of the present invention.

Turning to FIG. 5C, the present BCBF is subjected to different irradiation intensity (1, 3, and 5 kW/m²) in air for 6 cycles, where each cycle last for 1 hour. From the result, it shows that the evaporation rate remains substantially steady over 6 cycles of irradiation at different intensities up to 5 solar light in air (5 sun).

Figure 6B:
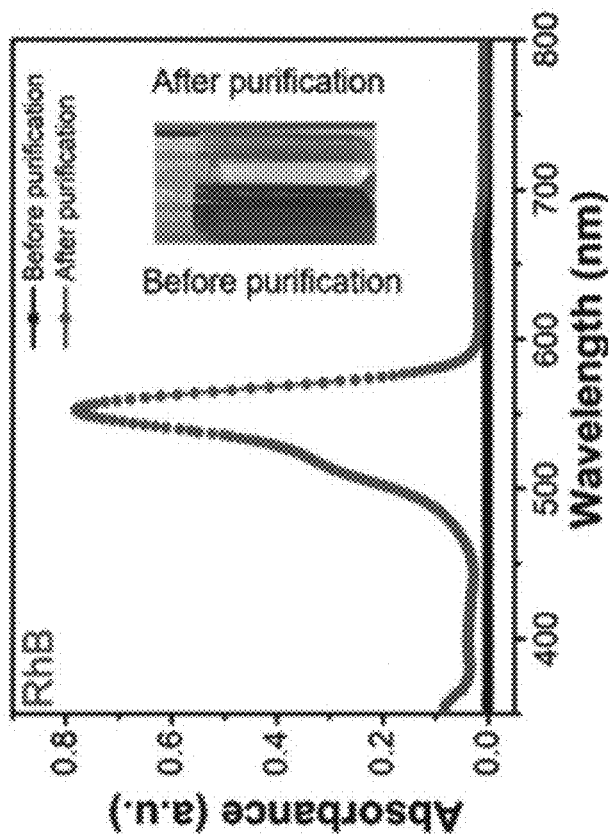
FIG. 6B shows UV-Vis-NIR absorption spectra of rhodamine B (RhB) containing wastewater.
Figure 6A:
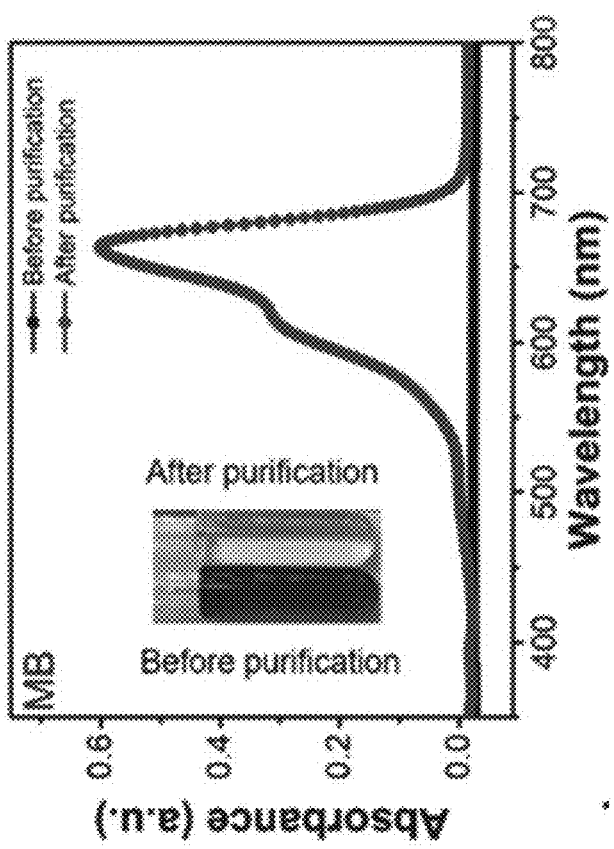
FIG. 6A shows UV-Vis-NIR absorption spectra of methylene blue (MB) containing wastewater (a)

Turning to FIG. 6A, a characteristic peak of methylene blue (MB) at 660 nm is observed in the present BCBF after the present BCBF is subjected to solar evaporation under 1 kW/m², and clean (colorless and transparent) water is collected after purification. Similarly, a characteristic peak of rhodamine B (RhB) at about 550 nm is observed in the present BCBF after it is subjected to the solar evaporation (FIG. 6B).

Figure 6D:
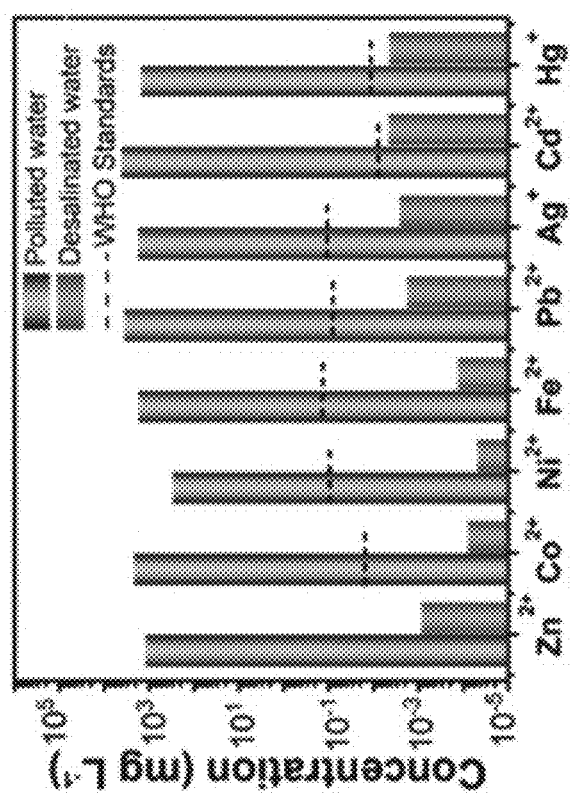
FIG. 6D shows change in some heavy metals in water before and after treated with the BCBF according to an embodiment of the present invention.
Figure 6C:
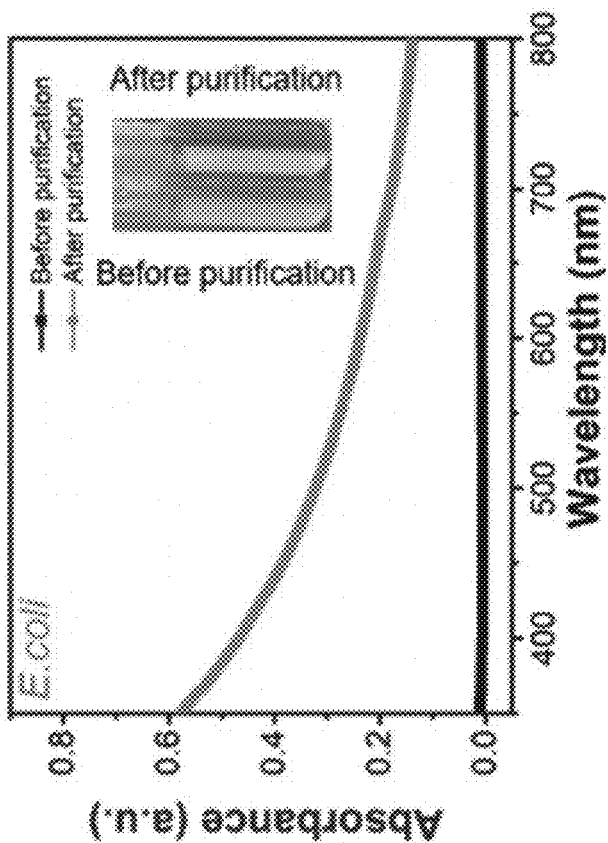
FIG. 6C shows change in absorbance of *E. coli*

Turning to FIG. 6C, bacteria (*E. coli*) in a microbial contaminated water are substantially removed by the present BCBF after being subjected to the solar evaporation, evident by disappearance on both torridness pattern and optical absorption at 600 nm.

Figure 6E:
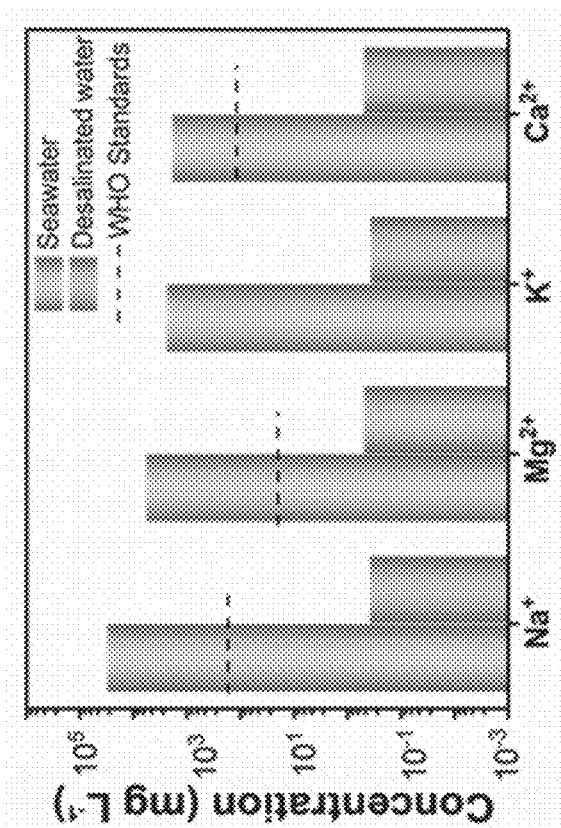
FIG. 6E shows change in other heavy metals in water before and after treated with the BCBF according to an embodiment of the present invention.
Figure 6F:
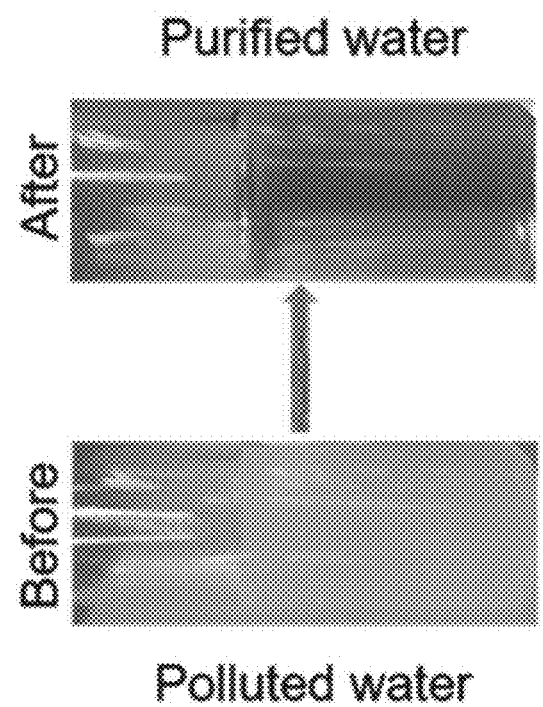
FIG. 6F shows photographs of wastewater before and after treated with the BCBF according to an embodiment of the present invention.

Turning to FIGS. 6D and 6E, different heavy metals ($Hg^+$, $Cd^{2+}$, $Pb^{2+}$, $Fe^{3+}$, $Co^{2+}$, $Ni^{2+}$, $Ag^+$, $Zn^{2+}$, $Na^+$, $Mg^{2+}$, $K^+$, $Ca^{2+}$) are shown to be purified by the present BCBF over 99.9%. FIG. 6F shows before and after solar purification by the present BCBF, the contaminated water by the heavy metals is clear.

Figure 7A:
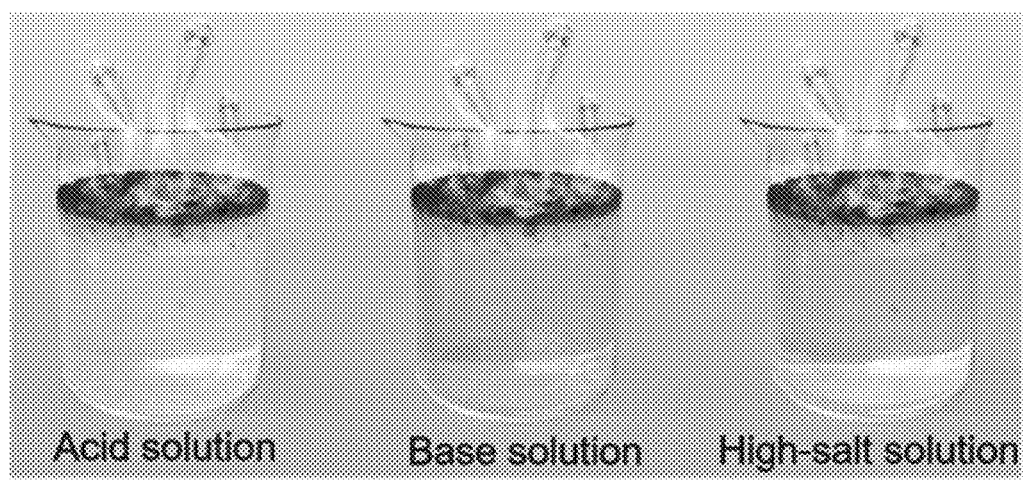
FIG. 7A schematically depicts deacidification, dealkalization and desalination tests of the present BCBF to mimic exposure to extreme conditions.
Figure 7B:
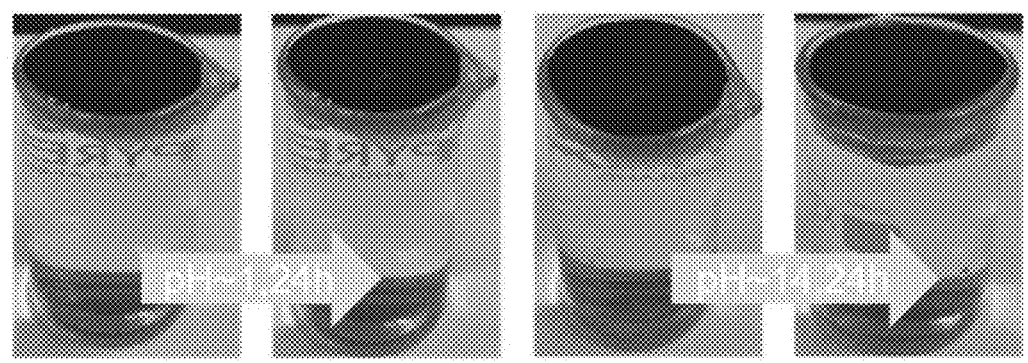
FIG. 7B shows stability test result of the present BCBF under pH 1 and pH 14 for 24 hours.
Figure 7C:
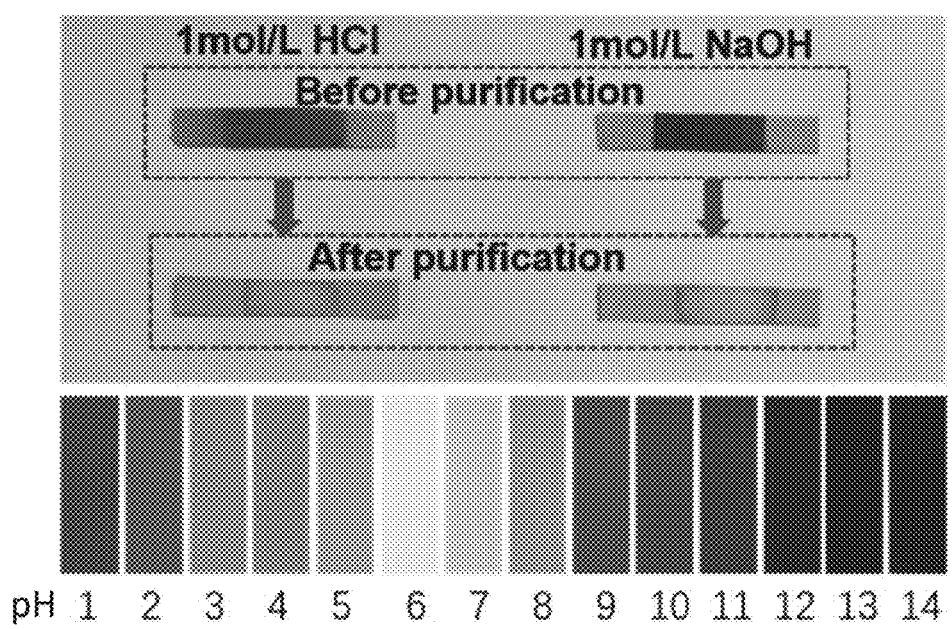
FIG. 7C shows dealkalization and desalination performances of the present BCBF evaporator.

To be qualified as an ideal solar evaporator, it should withstand extreme conditions such as concentrated acid, strong alkali, high salinity, etc. To demonstrate that the present BCBF is qualified to be an ideal solar evaporator under extreme conditions, the present BCBF is soaked for 24 hours in pH 1 or pH 14 condition (FIG. 7A). After that, no obvious changes in the appearance and microstructure have been observed (FIG. 7B). The present BCBF is also subjected to high-salt solution, which is also not observed with any obvious changes in appearance and microstructure. FIG. 7C shows that the present BCBF absorbs strong acid and strong alkali from the solution to turn the highly acidic or highly alkaline solution into a neutral solution under 1 solar light. From these results, the present invention is shown to be an ideal solar evaporator under extreme conditions.

In summary, the present invention is not just a high cost-performance evaporator, but also easy-to-fabricate, able to withstand extreme conditions and eliminate bacteria, heavy metals, and strong acid/alkali from any seawater and wastewater.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

INDUSTRIAL APPLICABILITY

The boron carbide bilayer foam (BCBF) of the present invention enables a high cost-performance seawater desalination and wastewater purification. Low-cost commercially available $B_4C$ powders are embedded into a porous polymer foam in a one-pot method to form the boron carbide bilayer foam (BCBF) with good hydrophilic wettability, heat-shielding, and solar-thermal conversion, in low cost which is as low as 3.6 $/m². Notably, under 1 sunlight illumination, the BCBF offers a high evaporation rate of 2.8 kg/m²/h with 93% solar evaporation efficiency. The present BCBF based solar evaporator is demonstrated to possess an ultra-high cost-effectiveness of 778 g/h/$, superior to recently reported solar evaporation systems. The present invention thereby provides an excellent and cost-effective solar evaporator tool for industrial-level water purification.

The invention claimed is:

1. A method for preparing a scaffold of a solar absorber incorporated bilayer foam for seawater desalination and wastewater purification, the method comprising:
   dissolving a plurality of solar absorbers into a solvent thoroughly;
   mixing the plurality of solar absorbers dissolved in solvent with one or more polymers vigorously to form a gelation formation mixture;
   adding the gelation formation mixture into a solution of hydrochloric acid and glutaraldehyde dropwisely to have an in-situ gelation to form a hydrogel;
   settling the hydrogel at a low temperature;
   freeze-drying the hydrogel until an aerogel is obtained which is the scaffold of the solar absorber incorporated bilayer foam.

2. The method of claim 1, wherein said mixing the plurality of solar absorbers dissolved in solvent with the one or more polymers vigorously is by sonication for about 1 to 60 minutes until the gelation formation mixture is formed.

3. The method of claim 1, wherein said adding the gelation formation mixture into the solution of hydrochloric acid and glutaraldehyde dropwisely comprises mild stirring during said adding for about 0.5 to 6 hours until the hydrogel is formed.

4. The method of claim 1, wherein said settling the hydrogel is carried out by immersing the hydrogel in water for overnight at about 5 to −30 degrees Celsius.

5. The method of claim 1, wherein the plurality of solar absorbers is selected from boron carbide.

6. The method of claim 1, wherein the one or more polymers comprise polyvinyl alcohol (PVA), polydimethylsiloxane (PDMS), polyurethane (PU) and melamine.

7. The method of claim 5, wherein boron carbide dissolved into the solvent is mixed with the one or more polymers in a weight ratio of 1:2-19, and wherein the one or more polymers is selected from polyvinyl alcohol.

8. The method of claim 7, wherein boron carbide at more than 0 to about 50% w/w with respect to polyvinyl alcohol is dissolved in the solvent.

9. The method of claim 8, wherein the solvent is an organic solvent selected from ethanol, methanol, acetone, or tetrahydrofuran.

* * * * *